United States Patent
Amin-Sanayei et al.

(10) Patent No.: US 8,080,621 B2
(45) Date of Patent: Dec. 20, 2011

(54) AQUEOUS PROCESS FOR MAKING FLUOROPOLYMERS

(75) Inventors: Ramin Amin-Sanayei, Collegeville, PA (US); Mehdi Durali, West Chester, PA (US); Patrick Kappler, Ecully (FR); Greylan Burch, Runnemede, NJ (US)

(73) Assignee: Arkema Inc., King of Prussia, PA (US)

( * ) Notice: Subject to any disclaimer, the term of this patent is extended or adjusted under 35 U.S.C. 154(b) by 1030 days.

(21) Appl. No.: 11/635,954

(22) Filed: Dec. 8, 2006

(65) Prior Publication Data

US 2007/0135546 A1 Jun. 14, 2007

Related U.S. Application Data

(63) Continuation-in-part of application No. 11/149,797, filed on Jun. 10, 2005, now abandoned.

(51) Int. Cl.
*C08F 18/20* (2006.01)
(52) U.S. Cl. .................. 526/247; 526/250; 526/255
(58) Field of Classification Search .................. 526/247, 526/250, 255
See application file for complete search history.

(56) References Cited

U.S. PATENT DOCUMENTS

| 4,450,263 | A |  | 5/1984 | West |
|---|---|---|---|---|
| 4,569,978 | A |  | 2/1986 | Barber |
| 5,478,561 | A | * | 12/1995 | Ferrero .................. 424/401 |
| 6,512,063 | B2 |  | 1/2003 | Tang |
| 6,693,152 | B2 |  | 2/2004 | Kaspar et al. |
| 6,734,264 | B1 |  | 5/2004 | Amin-Sanayei |
| 6,794,550 | B2 |  | 9/2004 | Hintzer et al. |
| 6,806,333 | B2 | * | 10/2004 | Ishida et al. .................. 526/250 |
| 6,933,357 | B2 |  | 8/2005 | Grootaert et al. |
| 7,041,728 | B2 |  | 5/2006 | Zipplies et al. |
| 2004/0077757 | A1 |  | 4/2004 | Araki et al. |
| 2004/0258648 | A1 |  | 12/2004 | Creamer et al. |
| 2005/0228127 | A1 |  | 10/2005 | Tatemoto et al. |
| 2006/0135716 | A1 |  | 6/2006 | Hung |

* cited by examiner

*Primary Examiner* — Robert A Hopkins
(74) *Attorney, Agent, or Firm* — Thomas F. Roland

(57) ABSTRACT

A novel aqueous polymerization process for making fluoropolymer dispersions is disclosed in which non-ionic non-fluorinated emulsifier is used to produce fluoropolymer emulsions. The emulsifiers contain blocks of polyethylene glycol, polypropylene glycol and/or polytetramethylene glycol. The process and fluoropolymer produced contain no fluorinated surfactant. The fluoropolymers have excellent resistance to discoloration.

11 Claims, No Drawings

AQUEOUS PROCESS FOR MAKING FLUOROPOLYMERS

This application is a continuation-in-part of U.S. application Ser. No. 11/149,797, filed Jun. 10, 2005 now abandoned.

FIELD OF THE INVENTION

The invention relates to a process for making fluoropolymers using non-fluorinated, non-ionic emulsifiers. The emulsifiers contain blocks of polyethylene glycol, polypropylene glycol and/or polytetramethylene glycol. The process and fluoropolymer produced contain no fluorinated surfactant. The fluoropolymers have excellent resistance to discoloration.

BACKGROUND OF THE INVENTION

Fluoropolymers are generally made by an aqueous dispersion process, which provides a suitable heat sink for controlling the heat of polymerization and can produce a high yield and high molecular weight relative to polymerization conducted in an organic solvent. In order to achieve stable dispersion or emulsion, a suitable surfactant or emulsifier must be employed. Fluorinated-surfactants are generally used because they can yield stable particle and high molecular weight fluoropolymers. However, the fluorinated-surfactants typically used in emulsion polymerization of fluoropolymers, such as the ammonium salt of perfluoro octanoic acid or salts of perfluoro alkyl sulfonic acids are expensive. They also present an environmental concern related to bio-persistence.

It is therefore desirable to carry out an aqueous dispersion polymerization of fluoropolymers in the absence of fluorinated-surfactants, without compromising the properties of the resultant fluoropolymers. It would also be desirable to produce small particle size emulsion so that latex stability during storage as well as quality of film formation is improved. Furthermore, it would be desirable to produce a dispersion and/or fluoropolymer resin having fewer extractable ions and extractable low molecular weight polymers, while generally yielding fluoropolymers that have similar or even improved properties compared to analogous fluoropolymers made in presence of added fluorinated-surfactants.

The present invention concerns non-fluorinated-surfactants that produce fluoropolymer emulsions with good latex stability during polymerization and excellent cleanliness of reactor surfaces after polymerization is complete. U.S. Pat. No. 4,128,517 discloses a cleaning method for fluoropolymer dispersions produced using fluorinated-surfactants where dispersion is subjected to industrial post-treatment processes, such as coagulation, washing and drying. Surprisingly, fluoropolymers made in accordance with the present invention can be cleaned from contaminants produced during dispersion polymerization. As a result, tough and thermally stable fluoropolymers are produced by aqueous emulsion polymerization of fluoro-monomers by a process that requires that the reaction be carried out at 50 to 130° C. in the presence of a water-soluble initiator such as potassium presulfate, and emulsifying agents described in this invention, and conventional chain transfer agents such as ethyl acetate, propane, and isopropyl alcohol and cleaned by post-treatment processes.

An aqueous dispersion polymerization is used as a means to control the thermal and viscosity problems associated with producing fluoropolymers. An aqueous dispersion consists of a discontinuous fluoropolymer phase dispersed throughout a water phase. Examples of aqueous dispersion polymerization include but not limited to emulsion and suspension polymerizations.

Emulsion polymerization of vinylidene fluoride ($VF_2$) at moderate pressures and temperatures using fluorinated surfactants, free radical initiators, and trichlorofluoromethane as chain transfer agent is taught in the U.S. Pat. No. 4,569,978 in which ($VF_2$) based polymers are produced with reduced tendency to generate cavity and greater resistance to discoloration at elevated temperatures. The process was refined in the U.S. Pat. No. 6,794,264 wherein particularly ozone depleting agent (trichlorofluoromethane) was replace by propane which is environmentally friendly chemical. It is noteworthy that in both processes fluorinated surfactant was needed to produce stable emulsion. For example, perfluorocarboxylate salts was used to stabilize fluoropolymer emulsion polymerizations, with the most common example being ammonium perfluorooctanoate or ammonium perfluoronanoate. The high degree of fluorination is thought to be necessary to prevent chain transfer reaction between a growing polymer chain and the surfactant which in turn may result in lowering molecular weight and/or inhibition of the polymerization.

Many attempts have been made to find a suitable emulsifier in place of fluorinated surfactant for such polymerizations, as disclosed in the background section of U.S. Pat. No. 6,512,063 in which sodium salt of hydrocarbon sulfonates as non-fluorinated but ionic emulsifier was employed. The ionic emulsifiers are undesired for high purity applications due to high levels extractable ions. Furthermore, alkyl sulfonates act as implicit chain transfer agent in the emulsion polymerization of fluoropolymers, as a result, it cannot be used in sufficient amount to produce small particle size latex without inhibiting such polymerizations.

Emulsifier-free aqueous emulsion polymerization process for making fluoropolymer such as TFE and/or VDF copolymers is described in WO 02/088207. In emulsifier free emulsion polymerization, first only inorganic ionic initiators such as persulfates or permangamates may work whereas organic peroxide initiators would not work. Second, the particle size of emulsifier free emulsion of fluoropolymers would be large; as a result, the shelf-life of latex would be very limited. Third, the solid content of emulsifier free latex is limited to low or moderate solids, where in fact a high solid latex is desirable in variety of commercial applications.

U.S. patent application Ser. No. 2006/0135716 describes fluoroelastomers having a Tg below −10° C. by copolymerizing perfluoropolyethers using an emulsion process. Alkyl groups on the listed surfactants exhibit high chain transfer activities in a conventional fluoropolymer emulsion when used at a sufficient amount to produce a stable latex, and as a result, the molecular weight of the resultant polymer will be considerably reduced. Thus, the properties of fluoroelastomers described in this reference are significantly different from fluoropolymers contemplated by the present invention.

The U.S. Pat. No. 6,794,550 describes a process in which fluoropolymer dispersions were synthesized in the presence of fluorinated emulsifiers. Nonionic emulsifiers were post-added to the dispersions, then a portion of fluorinated surfactant was removed by means of steam-volatilization at low pH. The disclosed process could never remove all of the fluorinated surfactant; therefore, the resultant fluoropolymer dispersion is not absolutely free of fluorinated surfactant, and a portion of the fluorinated surfactant will remain in the final dispersion. Moreover, the shelf-stability of said dispersion would be considerably reduced if not totally diminished due to heating the dispersion up to the steaming point at low pH. Further, the use of fluorosurfactants in the process, even when latter removed creates a waste stream containing fluorosurfactants and the associated environmental issues.

A method has been disclosed in WO 2005/082785 for removing fluorinated surfactant form waste water stream. The method comprises (i) adding a non-fluorinated surfactant to the waste water (ii) contacting the waste water with adsorbent particles to adsorb a portion of the fluorinated surfactant onto the particles (iii) separating the waste water and adsorbent particle. Although using fluoropolymer dispersion instead of waste water is not contemplated by inventors but can be practiced with some difficulties. The resultant fluoropolymer dispersion; however, is not absolutely free of fluorinated surfactant. A portion of fluorinated surfactant used in the first step of process will remain in the final dispersion.

"Fluorinated surfactant" and "fluoro-surfactant" as used herein means that the main surfactant chain contains fluorine atoms whereas in the present invention non-fluorinated surfactants means that there is no fluorine on the main chain, however the terminal groups can contain fluorine atoms.

Surprisingly it has now been found that a thermally stable fluoropolymer can be made by a process using absolutely no fluorinated surfactant and using only non-fluorinated, non-ionic emulsifiers containing blocks of polyethylene glycol polypropylene glycol, and/or polytetramethylene glycol having a variety of different terminal groups and functions. The fluoropolymer dispersions produced have good latex stability and shelf-life, and are coagulum and adhesion free. These dispersions are absolutely free of fluorinated or partially fluorinated surfactant. In other words, no fluorinated surfactant is ever used to synthesize, produce, and/or post stabilize in this present invention.

Furthermore, the fluoropolymer products of the disclosed process in the present invention, particularly vinylidene fluoride based polymers, are light colored polymers which resist discoloration and cavitation at normal temperatures for extrusion or other fabrication techniques. Such products have the inherent applied use characteristics known for a given fluoropolymer. In many applications, resistance to discoloration is an important characteristics of fluoropolymers; for example, in protective coatings, in architectural paints, and in fabricated parts.

SUMMARY OF THE INVENTION

The invention relates to an aqueous fluoropolymer dispersion and resin made therefrom comprising:
a) a fluoropolymer containing at least 50 mole percent of fluoromonomer units; and
b) from 100 ppm to 2 percent, based on the weight of the fluoropolymer solids, of one or more block emulsifier(s) having at least two different blocks, and having the formula:

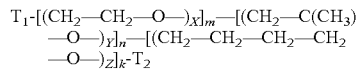

wherein, X, Y, and Z are between 2 to 200; and m, n, k are from 0 to 5, $T_1$ and $T_2$ are terminal groups selected from hydrogen, hydroxyl, carboxyl, ester, ether and/or hydrocarbon, and wherein said fluoropolymer is free of fluorosurfactants.

The invention also relates to a process for making a stable aqueous fluoropolymer dispersion by polymerizing at least one fluoromonomer in an aqueous medium comprising at least one emulsifier consisting of a non-fluorinated, non-ionic emulsifier containing polyethylene glycol polypropylene glycol, and/or polytetramethylene glycol segments with repeating units between 2 to 200, wherein no fluorosurfactant is used in the process.

The fluoropolymers of the disclosed process are light colored polymers which resist discoloration and cavitation at normal temperatures for extrusion, coating or other fabrication techniques.

DETAILED DESCRIPTION OF THE INVENTION

The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride, vinyl fluoride, trifluoroethylene, tetrafluoroethylene (TFE), chlorothrifluoroethylene (CTFE) and hexafluoropropylene (HFP) and their respected copolymers. The term "fluoropolymer" refers to polymers and copolymers (including polymers having two or more different monomers, including for example terpolymers) containing at least 50 mole percent of fluoromonomer units.

The term "vinylidene fluoride polymer" used herein includes both normally high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178, 399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidene fluoride, trifluoroethylene and tetrafluoroethylene are also representatives of the class of vinylidene fluoride copolymers which can be prepared by the process embodied herein.

As discussed in the prior art section, the field of VDF based copolymers is rich with teachings on how to produce copolymer resins with different mechanical properties in presence of fluoro-surfactant. It is therefore important to understand the background of the present invention in the context of the teaching how to produce VDF based polymers which are classed as thermoplastic, elastomer-modified thermoplastic, or elastomeric resins without using any fluorinated-surfactant.

Emulsifiers suitable for use in this invention are non-fluorinated non-ionic emulsifiers containing segments of polyethylene glycol (PEG), polypropylene glycol (PPG), polytetramethylene glycol (PTMG) or a combination thereof, with repeating units between 2 to 200, preferably between 3 to 100, and more preferably 5 to 50. The glycol-based emulsifiers used in this invention include, but are not limited to, polyethylene glycol acrylate (PEGA), polyethylene glycol methacrylate (PEG-MA), dimethyl polyethylene glycol (DMPEG), polyethylene glycol butyl ether (PEGBE), polyethylene glycol (PEG), polyethylene glycol phenol oxide (Triton X-100), polypropylene glycol acrylate (PPGA), polypropylene glycol (PPG) polypropylene glycol acrylate (PPGA), polypropylene glycol methacrylate (PPG-MA), and polytetramethylene glycol (PTMG).

Emulsifiers that contains blocks and having the following formula are preferred in making light colored polymers which resist discoloration and cavitation at normal temperatures for extrusion or other fabrication techniques.

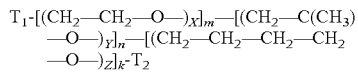

where X, Y, and Z are between 2 to 200; and m, n, k are from 0 to 5. $T_1$ and $T_2$ are terminal groups such as hydrogen, hydroxyl, carboxyl, ester, ether and/or hydrocarbon. One preferred block copolymer of the invention is a tri-block copolymer containing PEG and PPG blocks. These tri-block polymers may have a central block of either PEG or PPG, with the end blocks different than that of the central block. In one embodiment the PEG block(s) makes up less than 30 percent by weight of the triblock, preferably less than 20 weight percent, and most preferably less than 10 weight percent. One particularly preferred triblock copolymer is a triblock having a PEG central block and PPG endblocks.

The emulsifier may contain the same or different terminal groups on each end, such as hydroxyl, carboxylate, benzoate, sulfonic, phosphonic, acrylate, methacrylate, ether, hydrocarbon, phenol, functionalized phenol, ester, fatty ester, and the like. The terminal group can contain halogen atoms like F, Cl, Br and I, and also other groups or functions such as amine, amid, cycle hydrocarbon, and others. For example, polyethylene glycol acrylate with Mn about 375, polyethylene glycol with Mn about 570, polyethylene glycol methacrylate with Mn about 526, dimethyl polyethylene glycol with Mn about 250, polyethylene glycol butyl ether with Mn about 206, polyethylene glycol with Mn about 300, polypropylene glycol acrylate with Mn about 475, polypropylene glycol with Mn about 400, polypropylene glycol methacrylate (PPG-MA) with Mn about 375, and polytetramethylene glycol with Mn about 250 and polyethylene glycol with phenol oxide end group, and more specifically single, di, and triblocks of PEG, PPG, PTMG such as PPG-b-PEG-b-PPG (Pluronic 31R1 and 25R2 from BASF), PEG-b-PPG-b-PEG (Pluronic L101 and L-92 from BASF), PPG (Pluronic P-4000), and PEG (Pluronic E-2000) many other example can be used in this invention to produce stable fluoropolymer dispersion.

The chemical structure of the emulsifier of this invention could be altered so that PEG, PPG and/or polytetramethylene glycol (PTMG). would not be the main backbone but the essential properties such as water solubility, chain transfer activities, and protective behaviors remains the same.

The emulsifier is used at a level of from 100 ppm to 2 percent, 100 ppm to 1 percent and 100 ppm to ½ percent, based on the total polymer solids of the fluoropolymer formed in the dispersion.

In the polymerization process, the emulsifier of this invention could be added all upfront prior to polymerization, fed continuously during the polymerization, fed partly before and then during polymerization, or fed after polymerization started and progressed for a while.

The dispersion of the invention has a solids level of from 15 to 70 weight percent, preferably from 20 to 65 weight percent. The fluoropolymer particles in the dispersion have a particle size in the range of 50 to 500 nm, and preferably from 100-350 nm.

The manner of practicing the invention will now be generally described with respect to a specific embodiment thereof, namely polyvinylidene fluoride based polymer prepared in aqueous emulsion polymerization using non-fluorinated non-ionic emulsifier as the principle emulsifier. Although the process of the invention has been generally illustrated with respect to the polymerization of vinylidene fluoride based polymers, one of skill in the art will recognize that analogous polymerization techniques can be applied to the preparation of homopolymers and copolymers of fluorinated monomers in general, and more specific in VDF, TFE, and/or CTFE with co-reactive monomers fluorinated or non-fluorinated such as hexafluoropropylene, perfluorovinyl ether, propane, vinyl acetate, and the like.

The predetermined amount of water, non-fluorinated surfactant, and optionally chain transfer agent are placed in the reactor. After degassing procedure, the reactor temperature is raised to the desired polymerization temperature, the predetermined amount of either vinylidene fluoride alone or a mixture of monomers such as vinylidene fluoride and hexafluoropropylene are fed to the reactor. The temperature of the reaction can vary depending on the characteristics of the initiator used, but is typically from about 30° to 140° C., preferably from about 500 to 130° C. Once the pressure in the reactor has reached the desired level, an initiator solution, made of either potassium persulfate, ammonium persulfate, or an emulsion of one or more organic peroxides such as propyl peroxidicarbonate, or dibutylperoxide in water, is charged to start the polymerization reaction. The polymerization pressure may vary, but typically will be within the range of about 20 to 50 atmospheres. Following the initiation of the reaction, the vinylidene fluoride or vinylidene/hexafluoropropylene mixture is continuously fed along with additional initiator to maintain the desired pressure. Once the desired amount of polymer has been reached in the reactor, the monomer feed(s) will be stopped, but initiator feed is continued to consume residual monomer(s). In order to avoid compositional drifts in case of copolymers, after reactor pressure drops to a given level, a shot of vinylidene fluoride is added to bring the vinylidene fluoride concentration up. This step may be repeated more than one time depending on the hexafluoropropylene concentration in the reactor. When the reactor pressure is low enough, about 300 psig, the initiator charge is stopped and after a delay time the reactor is cooled. The unreacted monomer(s) are vented and the latex is recovered from the reactor. The polymer may then be isolated from the latex by standard methods, such as acid coagulation, freeze thaw or shear coagulation.

A paraffin antifoulant is an optional additive, and any long-chain, saturated, hydrocarbon wax or oil may be used for this purpose. Reactor loadings of the paraffin typically are from 0.01 percent to 0.3 percent by weight on the total monomer weight used.

A chain transfer agent may be added all at once at the beginning of the reaction, or it may be added in portions, or continuously throughout the course of the reaction. The amount of chain transfer agent added and its mode of addition depends on the desired molecular weight characteristics, but is normally used in an amount of from about 0.5 percent to about 5 percent based on total monomer weight used, preferably from about 0.5 percent to about 2 percent.

When copolymerization of vinylidene fluoride and hexafluoropropylene are performed, or copolymerization of any two coreactive fluorinated monomers having differing reaction rates, the initial monomer charge ratio and the incremental monomer feed ratio during polymerization can be adjusted according to apparent reactivity ratios to avoid compositional drift in the final copolymer product.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate, metabisulfite, or ascorbic acid. Among the organic peroxides which can be used for the polymerization are the classes of dialkyl peroxides, diacyl-peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396 and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

While the invention is generally practiced with the PEG, PPG, and/or PTMG emulsifier as the sole emulsifiers, co-emulsifiers or co-surfactants could also be present in the invention, including fluorinated or partially fluorinated or other non-fluorinated emulsifiers.

The process of present invention is easy, convenient, cost effective, and more importantly is coagulum and adhesion free. Moreover, this invention is concerns more with non-fluorinated-surfactants that produce fluoropolymer emulsions with good latex stability during polymerization and cleanliness of reactor surfaces after polymerization is complete. The fluoropolymer of this present invention can be cleaned from contaminants produced during dispersion polymerization of fluoropolymers by post-treatment processes, such as coagulation, washing and drying. The resultant fluoropolymers are tough and -thermally stable fluoropolymers. Furthermore, the fluoropolymer produced with the process of this invention, has a higher purity, with less extractable ions and less low molecular weight polymers.

The following examples further illustrate the best mode contemplated by the inventors for the practice of their invention and should be considered as illustrative and not in limitation thereof.

EXAMPLES

The glycol-based emulsifiers used in this example include polyethylene glycol acrylate (PEGA), polyethylene glycol (PEG), and polyethylene glycol octyl-phenyl ether (Triton X-100), polypropylene glycol acrylate (PPGA), polypropylene glycol (PPG), polyethylene glycol methacrylate (PEG-MA), dimethyl polyethylene glycol (DMPEG), polyethylene glycol butyl ether (PEGBE), polypropylene glycol methacrylate (PPGMA), polypropylene glycol di-methacrylate (PPG-DMA), and polytetramethylene glycol (PTMG). Inspection of results in the following table indicates that a with a low loading of the emulsifiers, emulsions of fluoropolymers having particle sizes of approximately 100 nm and higher were produced. The solid level of these novel emulsions were as high as 42%.

To a 1.7 liter agitated-autoclave reactor was added one liter of DI-water along with the reported amount of 10% aqueous solution of emulsifier (as shown in Table 1). The mixture was purged with argon and then heated to desired temperature of 82° C. The reactor was then charged with VF2/HFP to reach pressure of 4510 kPa. A continuous feed of the 1% aqueous initiator solution was added to the reaction and the pressure was maintained at 4480 kPa by adding as needed VF2/HFP. After the pre-determined amount of VF2 in the reactor was reached, addition of monomers were stopped and only initiator addition of initiator was continued till the pressure in the reactor was dropped to 300 psi. After cooling to room temperature, the reactor was emptied. Gravimetric solids and particle size measurements of the latex were conducted.

To a 7.8 liter agitated-autoclave reactor was added 3.4 liter of DI-water, 1 g paraffin wax along with the predetermined amount of emulsifier either in neat form or in 10% aqueous solution (as shown in Table 2). The mixture was purged with argon and then heated to 83° C. The reactor was then charged with VF2/HFP to reach pressure of 4510 kPa. A continuous feed of the 1% aqueous initiator solution was added to the reaction and the pressure was maintained at 4480 kPa by adding as needed VF2/HFP. After the pre-determined amount of VF2 in the reactor was reached, addition of monomers and initiator were stopped but reaction continued till the pressure in the reactor was dropped to 300 psi. After cooling to room temperature, the reactor was emptied. Gravimetric solids and particle size measurements of the latex were conducted. The latex stability was assessed based on settling characteristics; for example, latexes with particle size less than 150 nm did not settled even after 300 days of storage at ambient condition and latexes with particle size larger than 150 nm did not settled before 100 days. The particle size of the dispersion was determined using a Nicomp Model 380 Sub-Micron Particle Sizer including single mode 35 mW Laser diode with wavelength of 639 nm.

TABLE 1

| Surfactant type | surfactant solution, g | Initiator[1] ml | VDF[2] Ml | HFP[3] | Solids % | Particle size (nm) |
|---|---|---|---|---|---|---|
| PEGA | 7.5 | 186 | 473 | 193 | 37 | 108 |
| PEGA | 7.5 | 154 | 449 | 114 | 29 | 116 |
| PEGA | 4 | 100 | 541 | 160 | 37 | 143 |
| X-100 | 7.5 | 195 | 453 | 202 | 35 | 79 |
| PEG (200) | 7.6 | 64 | 451 | 194 | 35 | 232 |

TABLE 1-continued

| Surfactant type | surfactant solution, g | Initiator[1] ml | VDF[2] Ml | HFP[3] | Solids % | Particle size (nm) |
|---|---|---|---|---|---|---|
| PEG (300) | 7.5 | 109 | 450 | 191 | 36 | 235 |
| PEG | 7.5 | 122 | 360 | 217 | 42 | — |
| PEG (570) | 7.5 | 127 | 450 | 200 | 35 | 215 |
| PPG (450) | 7.5 | 123 | 450 | 198 | 36 | — |
| PPGA | 7.5 | 141 | 449 | 212 | 36 | 100 |
| PPGA | 3 | 99 | 450 | 202 | 35 | 150 |
| PPGA | 5.11 | 78 | 450 | 106 | 33 | 122 |
| PPGA | 5 | 59 | 500 | 102 | 32 | 123 |
| PPGA | 5 | 58 | 549 | 0 | 27 | — |
| PPGA | 6 | 81 | 650 | 0 | 32 | — |

[1] Initiator solution was made of 1% potassium persulfate and 1% sodium acetate
[2] Density of VDF at the feeding condition is 0.83 g/ml
[3] Density of HFP at the feeding condition is 1.35 g/ml

TABLE 2

| Surfactant Type | VF2 (g) | HFP (g) | KPS[1] (ml) | Surfactant (g) | Solids % | Particle Size (nm) |
|---|---|---|---|---|---|---|
| PPG | 1906 | 258 | 280 | 2.0 | 34 | 202 |
| PEGMA | 1906 | 872 | 476 | 2.0 | 38 | 134 |
| PPGMA | 1904 | 872 | 339 | 2.0 | 40 | 125 |
| PPGMA | 1908 | 846 | 519 | 3.0 | 38 | 112 |
| DMPEG | 1902 | 834 | 355 | 2.0 | 39 | 206 |
| DMPEG | 1908 | 880 | 640 | 3.0 | 38 | 207 |
| PEGBE | 1906 | 858 | 370 | 1.5 | 41 | 221 |
| PPGDMA | 2006 | 914 | 203 | 2.0 | 45 | 214 |
| PPGDMA | 2018 | 898 | 239 | 4.0 | 44 | 207 |
| PTMG | 2016 | 892 | 233 | 2.0 | 42 | 251 |
| PTMG | 2018 | 898 | 239 | 4.0 | 44 | 260 |

[1] Initiator solution was made of 1% potassium persulfate and 1% sodium acetate To a 7.8 liter agitated-autoclave reactor was added 3.4 liter of DI-water, 1 g paraffin wax along with the predetermined amount of emulsifier (as shown in Table 3). The mixture was purged with argon and then heated to desired reaction temperature. After addition of the predetermined amount of ethyl acetate to control the molecular weight of polymer, the reactor was then charged with VF2/HFP to reach pressure of 4510 kPa. A continuous feed of the aqueous initiator solution (1% Potassium persulfate plus 1% sodium Acetate) was added at fast rate to start the polymerization. Once polymerization progresses, the pressure was maintained at 4480 kPa by adding as needed VF2 and HFP. Also, the feed of the 1% aqueous initiator solution was continued at lower rate to maintain a desire polymerization rate. After the pre-determined amount of VF2 in the reactor was reached, addition of monomers and initiator were stopped but reaction continued till the pressure in the reactor was dropped to 300 psi. After cooling to room temperature, the reactor was emptied. Gravimetric solid measurements of the latex were conducted. Melt viscosity was measured with using a capillary rheometer at 230° C. and 100 s$^{-1}$.

TABLE 3

| | Surfactant type (Pluronic) | Surfactant g | Temp ° C. | Ethyl Acetate g | VF2 g | HFP g | KPS solution ml | solids | Coagulum % based on VF2 | Melt viscosity kp |
|---|---|---|---|---|---|---|---|---|---|---|
| 1 | 31R1 | 7.0 | 80 | 5 | 2414 | 334 | 408 | 43 | 1.3 | 30 |
| 2 | 31R1 | 3.75 | 83 | 8 | 2004 | 298 | 224 | 35 | 0.04 | 28 |
| 3 | 31R1 | 5 | 83 | 6 | 2524 | 0 | 272 | 38 | 0.4 | 38 |
| 4 | 31R1 | 5 | 83 | 8 | 2204 | 318 | 248 | 38 | 0.2 | |
| 5 | L101 | 5 | 83 | 8 | 2224 | 322 | 250 | 38 | 1.4 | |
| 6 | 25R2 | 5 | 83 | 8 | 2204 | 338 | 320 | 38 | 1.9 | |

To a 7.5 liter, stainless steel reactor was added 4035 g of water, 4 g of paraffin wax, and a predetermined aqueous surfactant solution of 1.33 wt % in Pluronic 3 IR1. The mixture was purged with argon and agitated for 0.5 hours. The reactor was sealed, agitation was continued, and the reactor was heated to desired temperature. The reactor was charged with vinylidene fluoride to a pressure of 4454 kPa. 17 g Di-tert-butyl peroxide (DTBP) plus an sufficient aqueous initiator solution 1.0 wt. % in potassium persulfate and 0.7 wt. % in sodium acetate was charged at 480 g/hr followed to start the reaction and then a steady feed of initiator solution at a rate of about 60.0 g/h throughout the rest of the reaction. The reaction pressure was maintained at 4480 kPa by adding as needed vinylidene fluoride. After 2454 g of VDF had been added to the reactor the monomer fed was stopped. For a period of 0.5 hours, agitation was continued, and the temperature was maintained. The agitation and heating were discontinued. After cooling to room temperature, surplus gas was vented, and the reactor was emptied of latex through a stainless steel mesh. Gravimetric solids measurements of the latex were conducted and polymer yields were determined based on the weight of the vinylidene fluoride fed to the reactor. The amount of potassium persulfate, which was used to convert the monomer to polymer, is reported based on the weight of vinylidene fluoride monomer. The melt viscosity of resin was determined at 230° C. and 100 s$^{-1}$ according to ASTM.

TABLE 4

| | surf. on H2O ppm | KPS on VDF ppm | DTBP g | temp ° C. | VDF g | Yield % | solids wt. % | melt vis. KP |
|---|---|---|---|---|---|---|---|---|
| 1 | 1126 | 943 | 17 | 90 | 2450 | 94.29 | 32.6 | 33.08 |
| 2 | 1126 | 1143 | 17 | 100 | 2450 | 92.8 | 32.86 | 31.02 |
| 3 | 1126 | 1069 | 17 | 110 | 2450 | 90.84 | 32.91 | |
| 4 | 563 | 1260 | 17 | 110 | 2454 | 78.64 | 31.17 | |

To a 28 liter agitated reactor was added 17 liter water, 1.4 g wax, predetermined amount of surfactant dispersed in 50 ml water. The reactor is purged with nitrogen then with VDF and heated at 83° C. After addition of predetermined amount of ethyl acetate to control the molecular weight of polymer, the reactor is pressurized at 4500 kpa with VDF. After addition of 350 ml of an aqueous solution of initiator containing of 1% potassium persulfate and 1% sodium acetate the pressure was maintained at 4500 kpa. A continuous feed of the 1% aqueous initiator solution was added to the reaction and the pressure was maintained at 4500 kPa by adding VDF to the reactor during the course of polymerisation. After the pre-determined amount of VF2 in the reactor was reached, addition of monomers was stopped and only initiator addition of initiator was continued till reactor pressure was dropped to 1500 kPa. After venting the non-reacted VDF, the reactor was cooled at 50° C., emptied. Latex was filtered; to determine a weight of coagulum and solid content of the latex. Melt viscosity measured with using a capillary rheometer at 230° C. and 100 s$^{-1}$.

TABLE 5

| | Surfactant Pluronic | Surfactant weight g | VDF feed kg | Solid level % | Coagulum g | KPS solution ml | Ethyl acetate g | Viscosity kp |
|---|---|---|---|---|---|---|---|---|
| Ex 1 | E-2000 | 8.5 | 6.8 | 30.5 | <100 | 370 | 36 | 37 |
| Ex 2 | P-4000 | 8.5 | 6.8 | 30 | <100 | 420 | 36 | |
| Ex 3 | 31R1 | 8.5 | 6.8 | 30 | <100 | 420 | 36 | |
| Ex 4 | 31R1 | 8.5 | 6.8 | 30 | <100 | 450 | 36 | |
| Ex 5 | P-4000 | 8.5 | 8.8 | 36 | <100 | 600 | 27 | |
| Ex 6 | P-4000 | 10.5 | 8.8 | 34 | <100 | 680 | 149 | 7 |

What is claimed is:

1. An aqueous fluoropolymer dispersion and resin made therefrom comprising:
    a) a fluoropolymer that is either a homopolymer of vinylidene fluoride or a copolymer consisting of 70 to 99 mole percent of vinylidene fluoride monomer units and 1 to 30 mole percent of one or more other fluoromonomers; and
    b) from 100 ppm to 2 percent, based on the weight of the fluoropolymer solids, of one or more block emulsifier(s) having at least two different blocks, and having the formula:

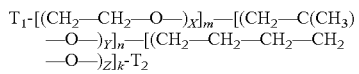

wherein, X, Y, and Z are between 2 to 200; and m, n, k are from 0 to 5, T$_1$ and T$_2$ are terminal groups selected from hydrogen, hydroxyl, carboxyl, ester, ether and/or hydrocarbon, and wherein said fluoropolymer is free of fluorosurfactants.

2. The fluoropolymer dispersion of claim 1, wherein said block emulsifier is a triblock polymer having polyethylene glycol (PEG) and polypropylene glycol (PPG) blocks.

3. The fluoropolymer of claim 2, wherein said triblock comprises a central PEG block, and end PPG end blocks.

4. The fluoropolymer of claim 3, wherein said central PEG block comprises less than 30 percent by weight of said triblock emulsifier.

5. The fluoropolymer of claim 4, wherein said central PEG block comprises less than 20 percent by weight of said triblock emulsifier.

6. The fluoropolymer of claim 5, wherein said central PEG block comprises less than 10 percent by weight of said triblock emulsifier.

7. The fluoropolymer composition of claim 1 comprising from 100 ppm to 1 percent, based on the weight of the fluoropolymer solids, of one or more emulsifiers having polyethylene glycol, polypropylene glycol, and/or polytetramethylene glycol blocks.

8. The fluoropolymer composition of claim 1 comprising from 100 ppm to ½ percent, based on the weight of the fluoropolymer solids, of one or more emulsifiers having polyethylene glycol, polypropylene glycol, and/or polytetramethylene glycol blocks.

9. The fluoropolymer composition of claim 1, wherein said fluoropolymer contains at least 50 mole percent vinylidene fluoride monomer units.

10. The fluoropolymer composition of claim 1 wherein said emulsifier(s) have polyethylene glycol, polypropylene glycol, and/or polytetramethylene glycol blocks with repeating units of from 3 to 100.

11. The fluoropolymer composition of claim 1 wherein said fluoromonomers are one or more fluoromonomers selected from the group consisting of tetrafluoroethylene, trifluoroethylene, chlorotrifluoroethylene, hexafluoropropene, vinyl fluoride, pentafluoropropene, perfluoromethyl vinyl ether, and perfluoropropyl vinyl ether.

* * * * *